(12) United States Patent
Oblizajek et al.

(10) Patent No.: US 8,645,097 B2
(45) Date of Patent: Feb. 4, 2014

(54) METHOD FOR ANALYZING OUTPUT FROM A ROTARY SENSOR

(75) Inventors: Kenneth L. Oblizajek, Troy, MI (US); John D. Sopoci, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 12/198,314

(22) Filed: Aug. 26, 2008

(65) Prior Publication Data

US 2010/0057396 A1 Mar. 4, 2010

(51) Int. Cl.
*G01C 9/00* (2006.01)
(52) U.S. Cl.
USPC .......... 702/151; 702/57; 702/64; 702/66; 702/67; 702/69; 702/71; 702/150; 702/189; 702/194; 702/199
(58) Field of Classification Search
USPC ............. 702/151, 57, 64, 66, 67, 69, 71, 150, 702/189, 194, 199
See application file for complete search history.

(56) References Cited

U.S. PATENT DOCUMENTS

| | | | | |
|---|---|---|---|---|
| 3,940,979 | A | * | 3/1976 | Ward et al. ............... 73/862.324 |
| 4,305,072 | A | * | 12/1981 | Makita ..................... 340/870.31 |
| 4,360,889 | A | * | 11/1982 | Liedtke ......................... 702/151 |
| 4,780,703 | A | * | 10/1988 | Ishida et al. ...................... 341/6 |
| 4,972,332 | A | * | 11/1990 | Luebbering et al. .......... 702/145 |
| 5,129,725 | A | * | 7/1992 | Ishizuka et al. ............... 356/617 |
| 5,801,301 | A | * | 9/1998 | Jeong .......................... 73/115.01 |
| 5,880,683 | A | * | 3/1999 | Brandestini ..................... 341/10 |
| 6,411,461 | B1 | * | 6/2002 | Szita ........................... 360/77.07 |
| 6,480,805 | B1 | | 11/2002 | Irle et al. |
| 6,789,042 | B2 | * | 9/2004 | Boyton ......................... 702/150 |
| 7,825,367 | B2 | * | 11/2010 | Nakamura et al. ....... 250/231.13 |
| 2005/0187667 | A1 | * | 8/2005 | Vredevoogd et al. ............ 701/1 |
| 2005/0189418 | A1 | * | 9/2005 | Hammerschmidt .......... 235/454 |
| 2006/0201238 | A1 | * | 9/2006 | Trapasso et al. ............. 73/117.3 |
| 2006/0249581 | A1 | * | 11/2006 | Smith ........................... 235/454 |
| 2009/0294206 | A1 | | 12/2009 | Oblizajek et al. |

FOREIGN PATENT DOCUMENTS

| | | |
|---|---|---|
| EP | 1081453 A1 | 3/2001 |
| JP | 60170720 | 9/1985 |
| WO | WO2007148181 A2 | 12/2007 |

OTHER PUBLICATIONS

Cyril M. Harris, Charles Batchelor; Shock and Vibration Handbook, Third Edition, Chapter 22, pp. 24-27, ISBN: 0-07-026801-0; McGraw-Hill Book Company, 1988.
Julius S. Bendat, Allan G. Piersol; Random Data, Analysis and Measurement Procedures, Second Edition, pp. 406-407, ISBN 0-471-04000-2; Wiley-Interscience Publication, John Wiley & Sons, 1986.

(Continued)

*Primary Examiner* — Jonathan C Teixeira Moffat
*Assistant Examiner* — Hyun Park
(74) *Attorney, Agent, or Firm* — Lionel D. Anderson; Reising Ethington P.C.

(57) ABSTRACT

A method for analyzing the output of a rotary sensor, such as that coupled to a vehicle wheel assembly. In one embodiment, the method detects periodic irregularities in the output of an incremental rotary sensor and uses those irregularities with a reference signal and a pattern comparison technique to determine the absolute angular position of the sensor.

19 Claims, 3 Drawing Sheets

(56) References Cited

OTHER PUBLICATIONS

Granino A. Korn, Theresa M. Korn; Mathematical Handbook for Scientists and Engineers, Second Edition, 18.10-1 & 18.10-2, pp. 641-643; Library of Congress Cat Card No. 67-16304; McGraw-Hill Book Company, 1968.

Ali Seireg; Mechanical Systems Analysis, pp. 477-478; Library of Congress Cat Card No. 77-86868; International Textbook Company, Scranton, Pennsylvania, 1969.

William H. Press, Brian P. Flannery, Saul A. Teukolsky, William T. Vetterling; Numerical Recipes, The Art of Scientific Computing, Chapter 12, Section 12.2, Fast Fourier Transform (FFT), pp. 390-696, ISBN 0-527-38330-7; Cambridge University Press, 1989.

William H. Press, Brian P. Flannery, Saul A. Teukolsky, William T. Vetterling; Numerical Recipes, The Art of Scientific Computing, Chapter 12, Fourier Transform Methods, pp. 381-385, for application to cross correlation, ISBN 0-527-38330-7; Cambridge University Press, 1989.

German Office Action dated Jul. 11, 2012, (6 pages).

\* cited by examiner

METHOD FOR ANALYZING OUTPUT FROM A ROTARY SENSOR

TECHNICAL FIELD

The present invention generally relates to sensors and, more particularly, to rotary sensors that provide a stream of data for a rotating object, such as a vehicle wheel assembly.

BACKGROUND

A variety of rotary sensors are used to convert the angular position of a rotating object into either analog or digital sensor output. Some examples of rotary sensors include absolute position sensors, incremental position sensors, magnetic sensors, optical sensors, mechanical sensors, various types of encoders, and more. As used herein, the term 'rotary sensor' broadly includes any sensing device and related electronics that can be coupled to a rotating object in order to provide a sensor output that is representative of the position, speed, acceleration, and/or any other movement-related characteristic of the rotating object.

Absolute rotary sensors can usually determine the actual rotational position of an object without requiring a home cycle, depending on a history of shaft rotation, or relying on cumulative counts. Typically, absolute rotary sensors divide the entire angular travel of the object into a number of discrete and unique positions; thus, absolute rotary sensors do not lose their position output if there is a loss of power or if the sensor is otherwise powered down.

Incremental rotary sensors, on the other hand, can generally determine the relative position of a rotating object, but usually need to keep a running count of pulses in order to relate the output to some starting or reference point. Some incremental rotary sensors provide two outputs that are 90° out of phase with each other, for example. These types of incremental sensors, sometimes referred to as quadrature encoders, not only indicate the relative position of the rotating object, but also the direction of rotation.

Again, it should be appreciated that the above-mentioned rotary sensors are only examples of some of the types of sensors that could be used to determine the rotational position of an object and that other types, including ones not mentioned here, could also be used in such a capacity.

SUMMARY OF THE INVENTION

According to one embodiment, there is provided a method of analyzing output from a rotary sensor. The method comprises the steps of: (a) receiving output from the rotary sensor, where the sensor output includes a pulse-train having a plurality of individual pulses; (b) calculating a duty cycle for each of the plurality of individual pulses; and (c) examining the plurality of duty cycles in order to identify periodic irregularities in the sensor output.

According to another embodiment, there is provided a method of analyzing output from a rotary sensor. The method comprises the steps of: (a) obtaining a reference signal for the rotary sensor; (b) receiving output from the rotary sensor; and (c) using a pattern comparison technique to relate the sensor output to the reference signal.

According to another embodiment, there is provided a method of analyzing output from a rotary sensor that is coupled to a vehicle wheel assembly. The method comprises the steps of: (a) obtaining a reference signal for the rotary sensor; (b) receiving output from the rotary sensor, where the sensor output is incremental and includes a pulse-train having a plurality of individual pulses; (c) calculating a duty cycle for each of the plurality of individual pulses; (d) averaging the plurality of duty cycles over a number of wheel revolutions, wherein the averaged duty cycles cause periodic content of the sensor output to be distinguishable from aperiodic content of the sensor output; and (e) using the periodic content and a cross-correlation function to correlate the sensor output and the reference signal in order to determine an absolute angular position of the rotary sensor.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method described below can be used to analyze the output from a rotary sensor, such as one coupled to a vehicle wheel assembly. In one embodiment, the method detects periodic irregularities in the output of an incremental rotary sensor and uses those irregularities to determine the absolute position of the sensor. It should be appreciated that while the following exemplary description is provided in the context of a magnetic-type incremental rotary sensor coupled to a vehicle wheel assembly, the present method could be used with other sensors and in different applications. For example, the present method could be used with mechanical-, optical-, magnetic- and other types of sensors, and it could be used with rotating objects other than vehicle wheel assemblies, to cite a few possibilities.

Figure 1:
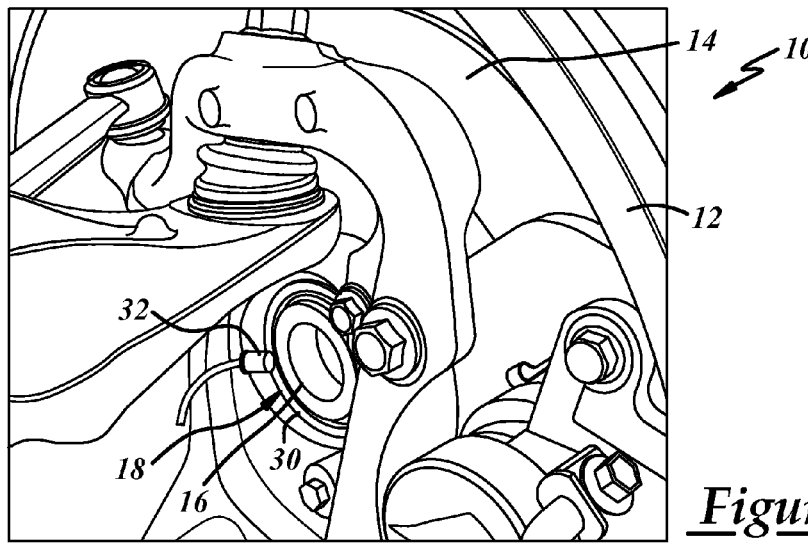
FIG. 1 is a perspective view of the inside of a vehicle wheel assembly that includes an exemplary rotary sensor assembly.

Turning now to FIG. 1, there is shown a perspective view of the inside of an exemplary vehicle wheel assembly 10, also known as a corner, which can be mounted on either the front or rear of a vehicle. According to this particular exemplary embodiment, vehicle wheel assembly 10 uses disk brakes and includes a wheel 12, a rotor 14, a hub 16, and a rotary sensor assembly 18. Other components of the wheel assembly that are well known in the art have been omitted for purposes of simplification and illustration.

Wheel 12 is securely attached to hub 16 with several lug nuts so the tire, wheel, hub, and rotor can all co-rotate together. Rotor 14 is generally a disk-shaped component that is located inboard of wheel 12 and is designed to be pinched by a brake caliper that is part of a disk brake system. Hub 16 carries the wheel and rotor and is rotatably mounted to one or more bearing devices, as is widely known in the art. Again, it should be understood that vehicle wheel assembly 10, with its disk brake setup, is merely exemplary. The present method could be used with one of a number of different rotating objects, including other types of wheel assemblies and non-wheel assemblies, and is not limited to the specific examples shown in the drawings.

Rotary sensor assembly 18 is preferably mounted concentrically with wheel assembly 10, and provides sensor output that is representative of rotational movement in the wheel assembly. According to one embodiment, rotary sensor assembly 18 is a magnetic-type, incremental rotary sensor and includes a rotational ring component 30 mounted to hub 16 and a stationary sensor component 32 mounted to a steerable knuckle or other non-rotating vehicle part. Rotational ring component 30 rotates with the wheel assembly and, according to the particular embodiment shown here, has a magnetically recorded sequence around its circumference. This sequence includes a series of alternating sections that affects the magnetic flux in a way that can be sensed by stationary sensor component 32. In one example, the magnetically recorded sequence produces a sensor output that is generally a square-wave when rotational ring component 30 is turning. This output may be similar to that produced by ring components having a series of teeth around their circumference, for example. Both types of rotational ring components, as well as any other types known in the art, may be used with the present method.

Stationary sensor component 32 is preferably mounted to a vehicle component that is fixed, relative to rotational ring component 30. A variety of stationary sensor types could be used, including Hall effect, inductive or variable reluctance type sensors, all known to skilled artisans. As vehicle wheel assembly 10 rotates, so too does rotational ring component 30. Stationary sensor component 32 and internal circuitry convert the varying magnetic flux, which varies according to revolving rotational ring component 30, into an electronic output in the form of a pulse-train. The shape and characteristics of the pulse-train can be affected by a number of variables, including the rotational speed of the wheel, the magnetically recorded sequence on the rotational ring component, the distance separating the rotational ring and stationary sensor components, rotational tire dynamics responsive to inconsistencies in the road surface, and others. Skilled artisans will appreciate that these and other factors usually result in a sensor output that is not a perfectly uniform pulse-train. Instead, the pulse-train oftentimes has irregularities, both periodic and aperiodic. The method described below generally uses the periodic irregularities to identify specific portions of the pulse-train, thus, providing analysis that may include determining the absolute angular position of the rotary sensor.

Figure 2:
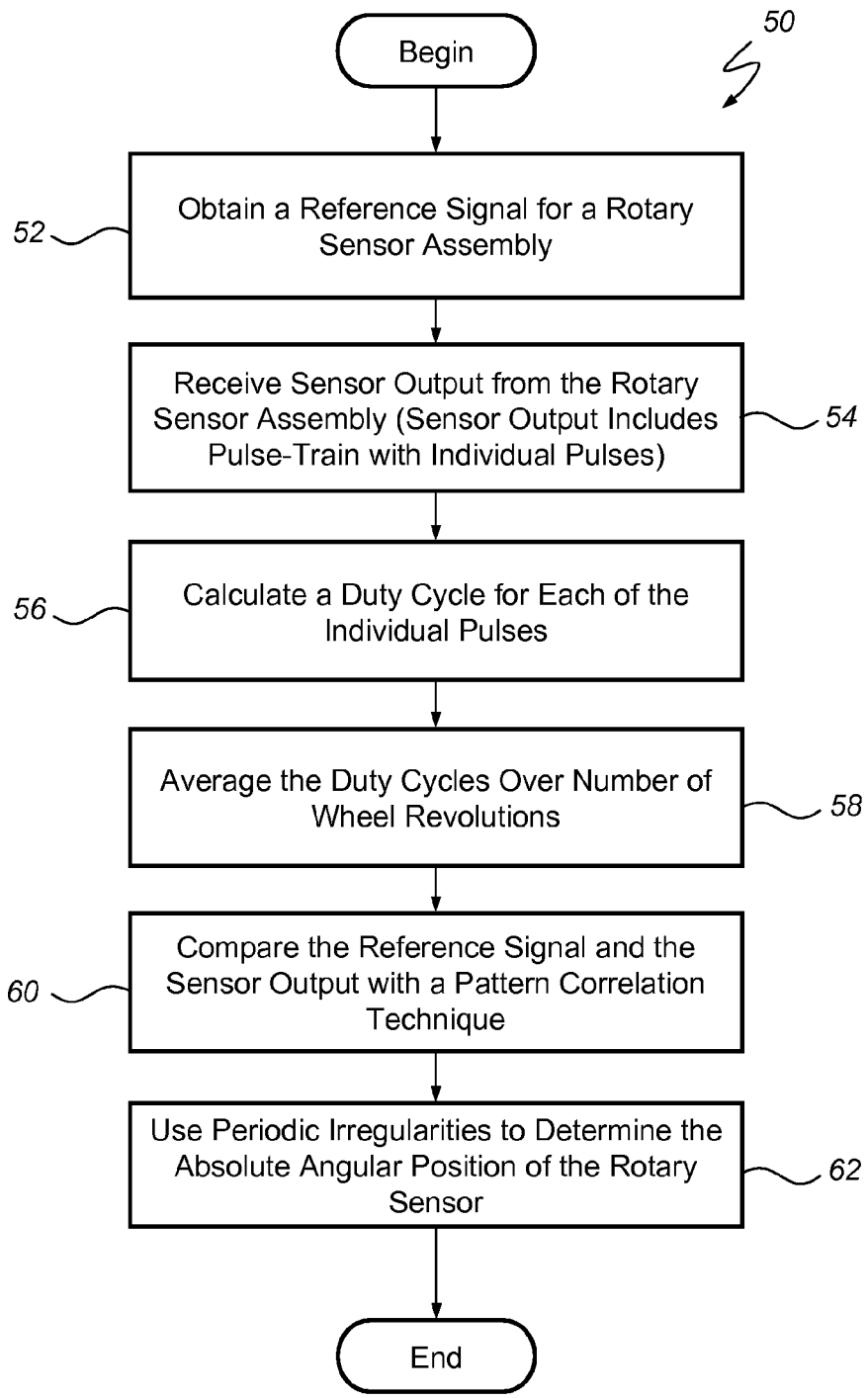
FIG. 2 is a flowchart illustrating some of the steps of an exemplary method for analyzing output from a rotary sensor, such as the rotary sensor assembly of FIG. 1.

With reference to FIG. 2, there is shown a flowchart illustrating some of the steps in an exemplary embodiment 50 of a method for analyzing sensor output from a rotary sensor, such as that shown in FIG. 1. Beginning with step 52, the method obtains a reference signal for rotary sensor assembly 18, where the reference signal generally acts as a unique and characteristic 'signature' for that particular sensor. Preferably, a separate reference signal is obtained for each sensor/wheel of interest; e.g., reference signals could be obtained for all four wheels of the vehicle, only the front or rear wheels, only the driver or passenger side wheels, a single wheel, or some other combination. It should be appreciated that step 52 is optional, and in some cases the present method may analyze output from rotary sensor assembly 18 without the assistance of a reference signal.

The reference signal obtained in step 52 may be obtained in a variety of ways and at a number of different times, intervals, or following various events, to cite a few possibilities. For example, it is possible for each rotary sensor of interest to be tested during vehicle manufacture and a corresponding reference signal to be acquired and stored at that time. Alternatively, the reference signal could be obtained on a periodic basis (e.g., once a year, month, week, day, etc.), on an event basis (e.g., each time the vehicle is started), or according to some other suitable basis. In those embodiments where the reference signal is periodically updated, the reference signal becomes 'adaptive' in that it takes into account long-term changes in the rotary sensor that can affect the sensor output over time. It is also possible to adopt a selective acquisition process where the reference signal is only acquired during certain appropriate operating conditions. For instance, a selective acquisition method could avoid obtaining the reference signal during periods of forceful acceleration or deceleration, aggressive steering, or other conditions that could undesirably skew the reference signal. An example of a process for obtaining the reference signal is provided below in the context of receiving typical sensor output, as both operations may employ similar techniques.

Figure 3A:
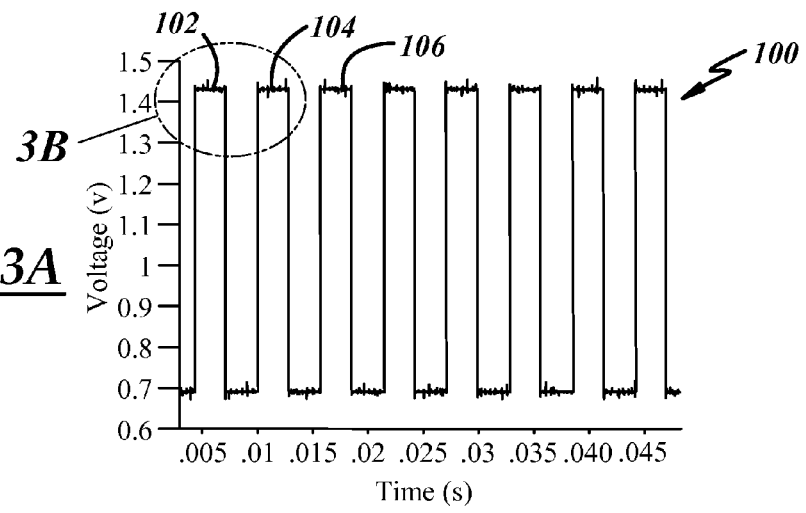
FIG. 3A is a plot of sensor output that includes an exemplary pulse-train having a number of individual pulses, where the sensor output may be provided by the rotary sensor assembly of FIG. 1.

Next, step 54 receives sensor output from rotary sensor assembly 18. In one embodiment, the sensor output is incremental (i.e., it does not expressly provide the absolute position of the object that it is measuring, as is the case with absolute rotary sensors) and it includes a pulse-train having a number of individual pulses. FIG. 3A shows an example of incremental sensor output (voltage) plotted against time (s), where the vehicle is traveling at about 20 mph. In this example, the incremental sensor output includes a pulse-train 100 having a number of individual pulses 102, 104, 106, etc., each of which corresponds to a different section of the magnetically recorded sequence located on rotational ring component 30. Once the sensor output has been received, a duty cycle can be calculated for each of the individual pulses 102, 104, 106, etc.; this may be performed in step 56.

Figure 3B:
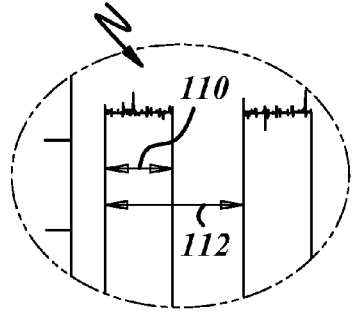
FIG. 3B is an enlarged view of one of the individual pulses from the pulse-train in FIG. 3A.

In order to determine the duty cycle for each individual pulse, step 56 may divide the width of each individual pulse by the width of the overall mean period or pitch. Turning to FIG. 3B, that figure shows exemplary pulse 102 in greater detail. As appreciated by those skilled in the art, the duty cycle for pulse 102 generally corresponds to the pulse width 110 divided by the overall mean period or pitch width 112 ((Pulse Width/Pitch Width)×100). In this particular example, the duty cycle for pulse 102 is about 48.66%. Using duty cycles, instead of the original pulse-train 100, enables this method to perform a speed-independent analysis. Put differently, the pulse widths 110 and period widths 112 are similarly affected by the rotational speed of the wheels; the faster the rotational speed, the shorter the pulses. Analyzing duty cycles, as opposed to the original pulse-train 100, accounts for periods where the vehicle speed is changing, which oftentimes occurs during operation. Because the duty cycles are ratiometric, they take these changes into account and produce data that is generally speed-independent.

Figure 3C:
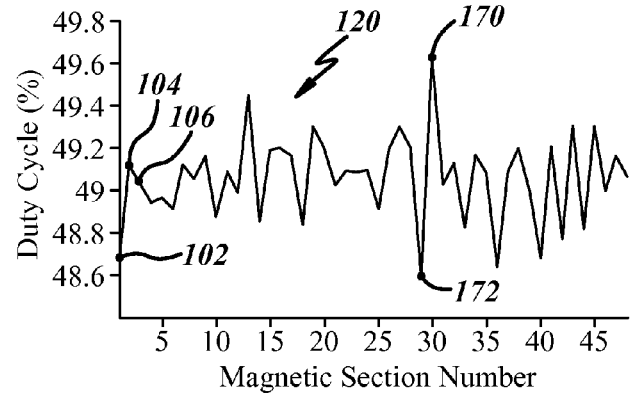
FIG. 3C is a plot of the duty cycles of the individual pulses from the pulse-train in FIG. 3A.

FIG. 3C illustrates a duty cycle waveform 120 where duty cycles for the individual sections of the magnetically recorded sequence are plotted on the x-axis and corresponding duty cycles (%) are plotted on the y-axis. The graph demonstrates the slight discrepancies that exist between the sections of the magnetically recorded sequence imprinted on rotational ring component 30, or any other rotary sensor components for that matter. These discrepancies lead to a sensor output pattern or signature that is generally unique for that particular sensor/wheel combination. If, for example, the magnetically recorded sequence on rotational ring component 30 were perfectly uniform, one would expect the duty cycle waveform 120 to be generally flat and without any peaks or valleys; this hypothetical assumes that there are no aperiodic irregularities.

Once the duty cycles have been determined, step 58 may average the duty cycles over a number of wheel revolutions in order to filter out aperiodic irregularities. This is an optional step, and in some embodiments it may be acceptable to simply measure the duty cycles over a single wheel revolution. As previously mentioned, the sensor output typically includes a number of irregularities caused by both periodic and aperiodic sources. The periodic irregularities generally repeat with each wheel revolution, while the aperiodic or non-periodic irregularities do not. Averaging the sensor output over a number of wheel revolutions usually improves the signal-to-noise (S/N) ratio and causes the periodic content to stand apart or become more distinguishable from the aperiodic content, which generally averages down over multiple wheel revolutions. In an exemplary embodiment, the duty cycles are averaged over 20-30 revolutions of the wheel assembly. Of course, additional signal processing techniques could be used to filter or otherwise process the sensor output.

Now that a reference signal and sensor output have been properly acquired, step 60 may use a pattern comparison technique or some other appropriate algorithm to relate the data. In the exemplary embodiment illustrated in FIGS. 4A-C, the pattern comparison technique uses a cross-correlation function to relate the newly acquired sensor output 150 (which in this case is derived from duty cycle waveform 120) to reference signal 152. Pattern comparison techniques, which can include pattern matching, pattern recognition and any other pattern-analyzing technique known in the art, can determine if there is a correspondence between the two sets of data, for example. Referring to the exemplary illustration in FIG. 4A, the sensor output 150 and reference signal 152 are misaligned with one another in both the horizontal and vertical directions (horizontal misalignment 160, vertical misalignment 162). The cross-correlation function may calculate offsets that shift waveforms 150 and/or 152 along the x-axis until they are generally aligned in a horizontal fashion; that is, they can take into account horizontal misalignment 160.

Figure 4A:
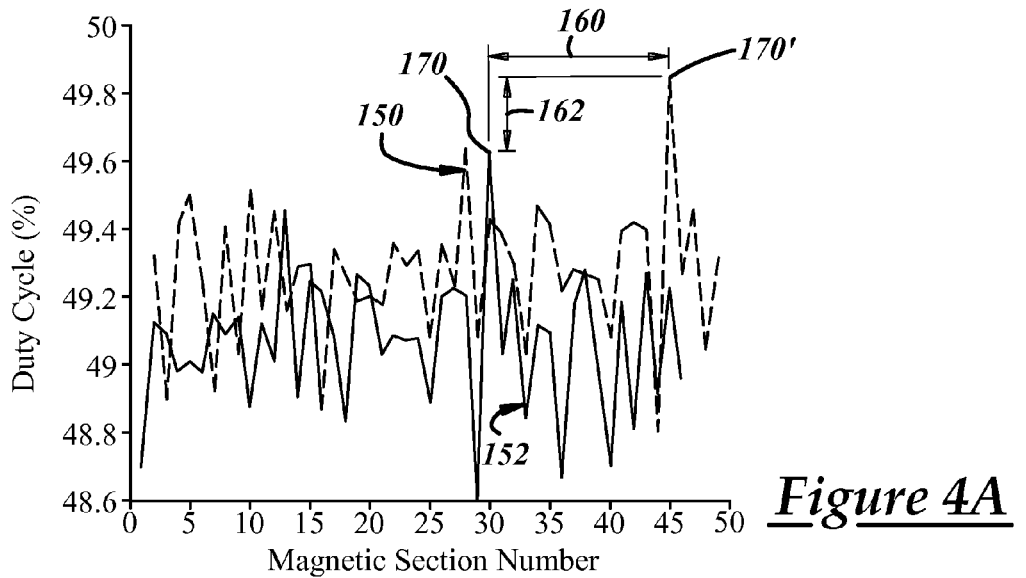
FIGS. 4A-C are plots illustrating steps of an exemplary pattern comparison technique that may be used to correlate sensor output with a reference signal.
Figure 4B:
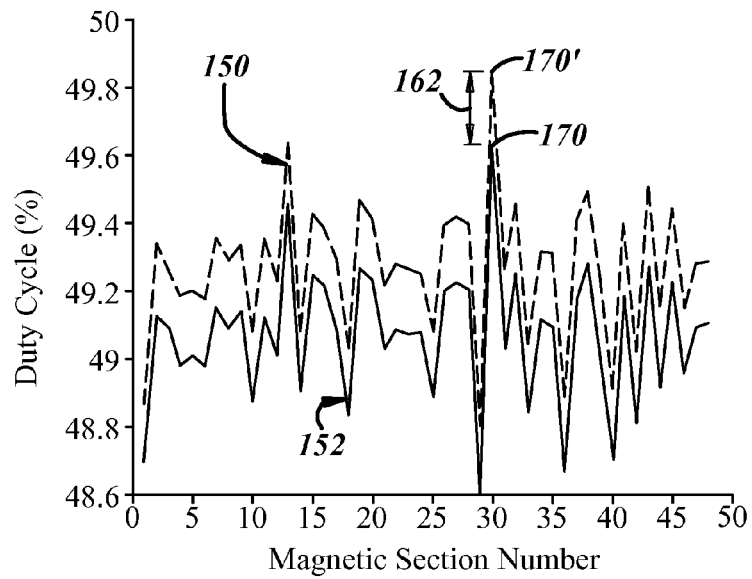
Figure 4C:
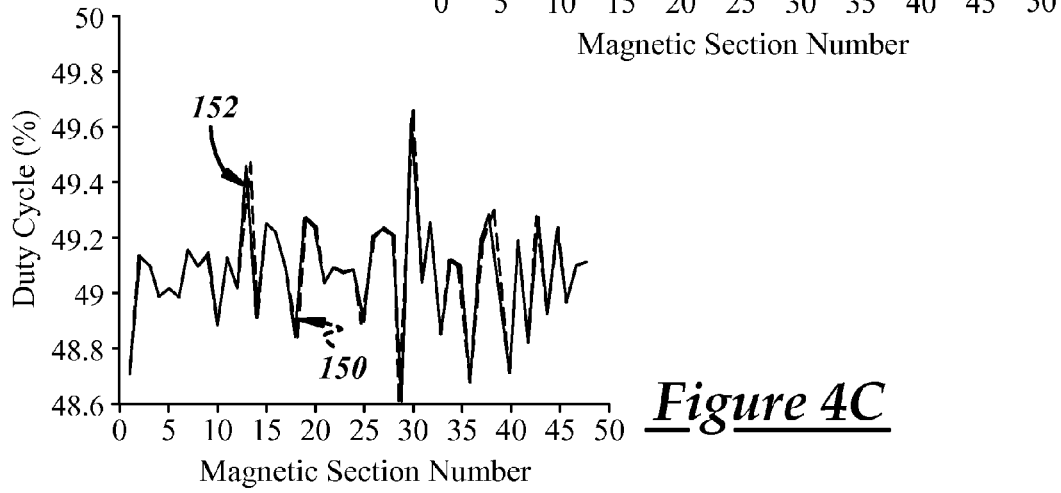

FIG. 4B illustrates the case where the two waveforms have been shifted so that they are horizontally aligned. A similar vertical offset may optionally be determined so that the two waveforms can also be aligned in the vertical direction and account for vertical misalignment 162. Once the two waveforms have been horizontally and/or vertically shifted, a resultant graph like that of FIG. 4C could be obtained. The strong correlation between the waveforms in FIG. 4C is attributable to the periodic nature of the irregularities, which may include unique and repeatable variations in the sensor output that result in a unique sensor signature. It should be appreciated that techniques other than cross-correlation functions could be employed and that domains other than the time domain, such as the wavelength or order domain, could be used. Furthermore, the graphic representations of FIGS. 4A-C are simply provided to help illustrate the mathematical computations that could take place in an appropriate cross-correlation function; graphs and plots may not actually be generated.

Some examples of suitable mathematical treatments, other than cross-correlation functions, that may be used to determine optimal horizontal alignment include: minimizing the sum of the squared differences between the pulse-trains in time or position domains, as a function of alignment offset or lag; and forming the transfer function of the two pulse-trains in frequency, wavelength or order domains and detecting the linear dependency of the phase factor on order. In the case of the second example, one such method could involve unwrapping the phase factor and extracting the best-fit linear dependence on order, either band-restrictive such as band-limited or all-inclusive, for example. Such techniques are known to those skilled in the art, including the interpretation of the best-fit parameters, and may be applied depending on the convenience of processing methods and preferred digital signal processing means. Selection of processing means may involve preferred coding in the case of programmable devices, and dedicated processing circuits for hardware acceleration of processing.

For more information on cross-correlation functions, please refer to Cyril M. Harris, Charles Batchelor, Editors, *Shock and Vibration Handbook*, Third Edition, Chapter 22, pp 24-27, ISBN 0-07-026801-0, McGraw-Hill Book Company, 1988; Julius S. Bendat, Allan G. Piersol, *Random Data, Analysis and Measurement Procedures*, Second Edition, pp 406-7, ISBN 0-471-04000-2, Wiley-Interscience Publication, John Wiley & Sons, 1986; Granino A. Korn, Theresa M. Korn, *Mathematical Handbook for Scientists and Engineers*, Second Edition, 18.10-1 & 18.10-2, pp 641-3, Library of Congress Cat Card Number 67-16304, 1968, McGraw-Hill Book Company; and Ali Seireg, *Mechanical Systems Analysis*, pp 477-8, Library of Congress Cat Card Number 77-86868, 1969, International Textbook Company, Scranton, Pa.

It should also be appreciated that various pulse-train processing techniques could optionally be employed taking advantage, for example, of methods such as Fast Fourier Transforms (FFT) while transforming the pulse-train sequence to the wavelength or order domain. Such techniques are not necessary, but may be used in order to accelerate processing cycle time, for instance. An explanation of exemplary FFT techniques and application to cross correlation are provided in William H. Press, Brian P. Flannery, Saul A. Teukolsky, William T. Vetterling, *Numerical Recipes, The Art of Scientific Computing*, Chapter 12, section 12.2, Fast Fourier Transform (FFT), pp 390-6, and Chapter 12 Fourier Transform Methods, pp 381-5, for application to cross correlation, ISBN 0 521 38330 7, 1989, Cambridge University Press.

Step 62 may use the periodic irregularities and a pattern comparison technique to determine an absolute angular position of the rotary sensor. As mentioned earlier, each sensor generates output that has both periodic and aperiodic irregularities. In the case where the aperiodic irregularities have been filtered out, removed or otherwise mitigated, the pattern comparison technique in step 60 can use the periodic irregularities to evaluate the two waveforms. Each of the exemplary waveforms 150, 152 includes a number of periodic irregularities, some of which are represented as peaks and valleys in the graph. The most notable of the periodic irregularities is probably peak 170, 170' which is significantly taller than the adjacent peaks and shows up in both waveforms. Peak 170 corresponds to a specific magnetic section of the magnetically recorded sequence which is located on rotational ring component 32 (in the exemplary reference signal 152, peak 170 corresponds with magnetic section number 31). In this example, method 50 could analyze output from rotary sensor assembly 18, compare that data to a reference signal as explained above, and determine that the current absolute angular position of the sensor corresponds to the $31^{st}$ magnetic section on the sensor, for example. If the method also possessed information to correlate the absolute angular position of the sensor with that of the wheel (e.g., knowing that the $31^{st}$ magnetic section of the sensor corresponds to 5° clockwise of a valve stem), then an absolute angular position for the wheel could also be determined.

In order to have a sufficient correlation between the sensor output and the reference signal, it is preferable that the data be from the same sensor/wheel assembly. That is, the reference signal should be obtained from the same sensor that generated the newly acquired sensor output. It can also be preferable to use the same number of wheel revolutions in the averaging functions; that is, if the reference signal was obtained by averaging duty cycles over 25 revolutions, then the sensor output duty cycles should also be averaged over 25 revolutions. It should be appreciated that a method similar to that described in steps 54-58 could be used to obtain the reference signal in step 52. In such a case, sensor output could be acquired over a number of wheel revolutions, duty cycles could be determined and averaged to remove or minimize aperiodic content, and a resulting reference signal could then be obtained.

There are a number of instances when absolute angular position information may be useful. For example, incremental rotary sensors normally provide sensor output in the form of a continuous pulse-train, where the number of pulses are detected and counted on an ongoing basis. When the pulse count reaches a predetermined number, for example 48 pulses, the device knows that a full revolution of the wheel has taken place. This method is reliable and can be used if there are no interruptions in the pulse-train, such as those associated with missed pulse-train edge transitions, or if there are no spurious detected transitions from noisy signals and the like. Also, if there is an interruption in power, if the vehicle rolls backwards (such as when waiting at a stop light), if the wheels lock up, or if one of a number of other events occurs that causes the pulse count to be contaminated, the incremental rotary sensor may have to reestablish the absolute reference. The method described above can address the need for this type of frame-of-reference reestablishment by using periodic irregularities to determine the absolute angular position of the rotary sensor.

Some incremental rotary sensors are known to provide a once-per-revolution signal (e.g., an index or reference signal) in addition to the normal sensor output. Such a signal can be used as a starting or reference point for each revolution and is suitable for certain applications. In other applications, however, it may add cost, complexity, and other challenges that are not desirable. For instance, some vehicle antilock braking systems (ABS) only allow a sensor output angular position error that is within a small tolerance window, such as 2% for example. As seen in FIG. 3C, sensor output 150 includes a high point that corresponds to periodic irregularity 170 (peak value of about 49.6%) and a low point that corresponds to periodic irregularity 172 (low value of about 48.6%). Thus, the total swing or difference between the highest and lowest points is approximately 1.0%, which is within a 2% tolerance window. The exemplary method described above can use output from conventional incremental rotary sensors with variation in angular position error, including those with or without once-per-revolution reference signals, to determine the absolute angular position of a rotary sensor coupled to a vehicle wheel. If the intrinsic angular position error is insufficient to reliably determine the absolute reference (i.e., if the pulse-train of the sensor output is so uniform that it does not produce sufficient periodic irregularities), then magnetically recorded sequences or other patterns could be used that intentionally have position departures or irregularities, so long as they are within acceptable tolerance limits for conventional devices, like ABS modules, etc.

The various calculations and steps described above may be performed by any number of suitable components on and off the vehicle, but in one embodiment are performed by a vehicle electronic module. An example of a suitable vehicle electronic module is the ABS module. The results in method 50 could be provided to a number of different devices and could be used in a variety of applications. In an exemplary embodiment, the absolute angular position data of the present method is used by the method disclosed in U.S. patent application Ser. No. 12/130,547, which was filed May 30, 2008 and is assigned to the present assignee.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, skilled artisans will appreciate that the present method could be used with any number of rotary sensors and is not limited to use with the exemplary magnetic-type incremental rotary sensor described above. Moreover, the method described above could be modified to include a fewer number of steps, a greater number of steps, different steps, a different sequence of steps, or any other combination of steps that would be apparent to one skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. Method of analyzing output from an incremental rotary sensor, comprising the steps of:
   (a) obtaining a unique reference signal measured from the rotary sensor;
   (b) receiving output from the rotary sensor, the sensor output includes a plurality of individual pulses that are generally uniform in pulse-width and have some discrepancies;
   (c) calculating a duty cycle for each of the plurality of individual pulses that are generally uniform in pulse-width;
   (d) averaging the plurality of duty cycles over a number of revolutions, wherein the averaged duty cycles cause periodic content of the sensor output to be distinguishable from aperiodic content of the sensor output; and
   (e) identifying periodic irregularities in the averaged duty cycles of the sensor output, wherein a vehicle electronic module compares the periodic irregularities in the averaged duty cycles of the sensor output to the reference signal to determine the absolute angular position of the rotary sensor even though the plurality of individual pulses are generally uniform in pulse-width.

2. The method of claim 1, wherein the reference signal is obtained on at least one of a time basis or an event basis so that the reference signal is adaptive.

3. The method of claim 1, wherein the periodic irregularities in the sensor output are compared to the reference signal using a pattern comparison technique.

4. The method of claim 3, wherein the pattern comparison technique employs a cross-correlation function.

5. The method of claim 4, wherein the cross-correlation function calculates a horizontal offset that exists between the sensor output and a reference signal.

6. The method of claim 1, wherein the periodic irregularities in the sensor output are compared to a reference signal using at least one of the following techniques: a fast Fourier transform (FFT), a best-fit method, or a phase factor method.

7. The method of claim 1, wherein each of the plurality of individual pulses corresponds to a different section of a magnetically recorded sequence located on a rotational ring component of the rotary sensor.

8. The method of claim 1, wherein the plurality of duty cycles are averaged over 20-30 wheel revolutions.

9. The method of claim 1, wherein the rotary sensor includes a rotational ring component that is coupled to a rotating vehicle wheel, and a stationary sensor component that is coupled to a fixed vehicle component, relative to the rotational ring component.

10. Method of analyzing an incremental output from a rotary sensor, comprising the steps of:
    (a) obtaining a unique reference signal measured from the rotary sensor;
    (b) receiving output from the rotary sensor; and
    (c) using a pattern comparison technique that compares discrepancies in a plurality of duty cycles that are generally uniform in pulse-width to the reference signal, wherein a vehicle electronic module uses the pattern comparison technique to determine the absolute angular position of the rotary sensor.

11. The method of claim 10, wherein step (a) comprises obtaining the reference signal on at least one of a time basis or an event basis so that the reference signal is adaptive.

12. The method of claim 10, wherein the pattern comparison technique employs a cross-correlation function.

13. The method of claim 12, wherein the cross-correlation function calculates a horizontal offset that exists between the sensor output and the reference signal.

14. The method of claim 10, wherein the pattern comparison technique employs at least one of the following techniques: a fast Fourier transform (FFT), a best-fit method, or a phase factor method.

15. The method of claim 10, wherein step (b) further comprises receiving output from the rotary sensor that includes a pulse-train having a plurality of individual pulses.

16. The method of claim 15, further comprising the step of:
    calculating a duty cycle for each of the plurality of individual pulses; and
    averaging the plurality of duty cycles over a number of wheel revolutions before performing step (c), wherein the averaged duty cycles cause periodic content of the sensor output to be distinguishable from aperiodic content of the sensor output.

17. The method of claim 16, wherein the plurality of duty cycles are averaged over 20-30 wheel revolutions.

18. The method of claim 10, wherein the rotary sensor includes a rotational ring component that is coupled to a rotating vehicle wheel, and a stationary sensor component that is coupled to a fixed vehicle component, relative to the rotational ring component.

19. Method of analyzing output from an incremental rotary sensor that is coupled to a vehicle wheel assembly, comprising the steps of:
    (a) obtaining a unique reference signal measured for the rotary sensor coupled to the vehicle wheel assembly;
    (b) receiving output from the rotary sensor coupled to the vehicle wheel assembly, the sensor output is incremental and includes a pulse-train having a plurality of individual pulses that are generally uniform in pulse-width and correspond to a rotating component of the vehicle wheel assembly;
    (c) calculating a duty cycle for each of the plurality of individual pulses that are generally uniform in pulse-width and correspond to the rotating component of the vehicle wheel assembly;
    (d) averaging the plurality of duty cycles over a number of wheel revolutions, wherein the averaged duty cycles cause periodic content of the averaged duty cycles to be distinguishable from aperiodic content of the averaged duty cycles; and
    (e) using a cross-correlation function with a vehicle electronic module to correlate the periodic content of the averaged duty cycles to the reference signal in order to determine an absolute angular position of the rotating component of the vehicle wheel assembly even though the plurality of individual pulses are generally uniform in pulse-width.

* * * * *